US012665210B2

(12) United States Patent
Matsushita et al.

(10) Patent No.: US 12,665,210 B2
(45) Date of Patent: Jun. 23, 2026

(54) ELECTROLYTE MATERIAL, MEMBRANE ELECTRODE ASSEMBLY AND POLYMER ELECTROLYTE FUEL CELL

(71) Applicant: AGC INC., Tokyo (JP)

(72) Inventors: Satoshi Matsushita, Tokyo (JP); Takumi Okuyama, Tokyo (JP); Susumu Saito, Tokyo (JP)

(73) Assignee: AGC INC., Tokyo (JP)

( * ) Notice: Subject to any disclaimer, the term of this patent is extended or adjusted under 35 U.S.C. 154(b) by 508 days.

(21) Appl. No.: 18/374,025

(22) Filed: Sep. 28, 2023

(65) Prior Publication Data

US 2024/0030473 A1 Jan. 25, 2024

Related U.S. Application Data

(63) Continuation of application No. PCT/JP2022/015089, filed on Mar. 28, 2022.

(30) Foreign Application Priority Data

Mar. 29, 2021 (JP) ................................ 2021-055644

(51) Int. Cl.

*H01M 8/1039* (2016.01)
*C08F 214/26* (2006.01)
*C08J 5/22* (2006.01)
*H01M 8/10* (2016.01)
*H01M 8/1004* (2016.01)

(52) U.S. Cl.

CPC ....... *H01M 8/1039* (2013.01); *C08F 214/262* (2013.01); *C08J 5/2237* (2013.01); *H01M 8/1004* (2013.01); *C08F 2810/50* (2013.01); *C08J 2327/22* (2013.01); *H01M 2008/1095* (2013.01)

(58) Field of Classification Search

CPC ............ H01M 8/1039; H01M 8/1004; H01M 2008/1095; C08F 214/262; C08F 2810/50; C08J 5/2237; C08J 2327/22

See application file for complete search history.

(56) References Cited

U.S. PATENT DOCUMENTS 7,557,178 B2 7/2009 Tayanagi et al.

FOREIGN PATENT DOCUMENTS

JP 2001176524 A 6/2001
WO WO-2016104380 A1 6/2016

OTHER PUBLICATIONS

International Search Report issued Jun. 7, 2022 in PCT/JP2022/015089 (with English translation), 4 pages.

*Primary Examiner* — Sarah A. Slifka
(74) *Attorney, Agent, or Firm* — Element IP, PLC

(57) ABSTRACT

The present invention provides an electrolyte material which can form crack-resistant catalyst layers when used in membrane electrode assemblies and enables provision of fuel cells having good power generation characteristics, a membrane electrode assembly and a polymer electrolyte fuel cell. The electrolyte material of the present invention is made of a polymer having ion exchange groups comprising units based on tetrafluoroethylene, units having an ion exchange group and no cyclic ether structure, units having a cyclic ether structure and units based on a monomer having at least two polymerizable unsaturated bonds.

12 Claims, 1 Drawing Sheet

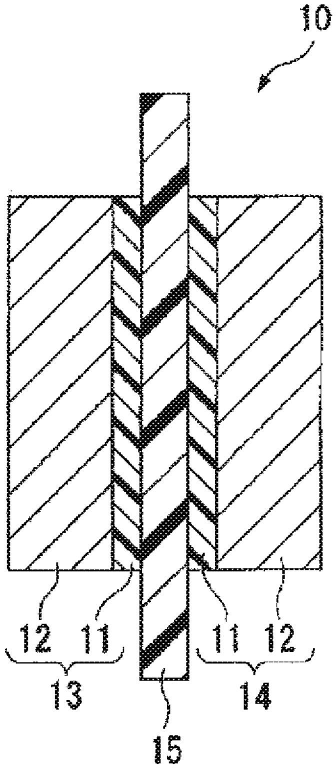
10
12
11
11
12
13
14
15

ELECTROLYTE MATERIAL, MEMBRANE ELECTRODE ASSEMBLY AND POLYMER ELECTROLYTE FUEL CELL

TECHNICAL FIELD

The present invention relates to an electrolyte material, a membrane electrode assembly and a polymer electrolyte fuel cell.

BACKGROUND ART

The membrane electrode assembly in polymer electrolyte fuel cells generally comprises an anode having a catalyst layer comprising an electrolyte material, a cathode having a catalyst layer comprising an electrolyte material, and a polymer electrolyte membrane comprising an electrolyte material sandwiched between the anode and the cathode. The electrolyte materials in these parts of the membrane electrode assembly are polymers having ion exchange groups.

Patent Document 1 discloses use of a polymer comprising units based on tetrafluoroethylene, units having an ion exchange group and units having a cyclic ether structure as an electrolyte material in the anode and cathode catalyst layers.

PRIOR ART DOCUMENTS

Patent Documents

Patent Document 1: WO2016/104380

DISCLOSURE OF INVENTION

Technical Problem

Recent years have seen a demand for higher-performance fuel cells. According to the present inventors, the electrolyte material disclosed in Patent Document 1 formed catalyst layers with insufficient crack resistance and needed some improvement, although fuel cells comprising such catalyst layers showed good power generation characteristics.

In view of the above-mentioned circumstances, the present invention aim to provide an electrolyte material which can form catalyst layers resistant to cracking when used in membrane electrode assemblies and enables provision of fuel cells having good power generation characteristics, a membrane electrode assembly and a polymer electrolyte fuel cell.

Solution to Problem

As a result of their extensive studies on the above-mentioned problem, the present inventors have found that use of a polymer comprising units based on tetrafluoroethylene, units having an ion exchange group and no cyclic ether structure, units having a cyclic ether structure and units based on a monomer having at least two polymerizable unsaturated bonds as an electrolyte material in catalyst layers leads to desired results.

Namely, the present inventors have found the following solutions to the above-mentioned problem.

[1] An electrolyte material made of a polymer having ion exchange groups, wherein the polymer comprises units based on tetrafluoroethylene, units having an ion exchange group and no cyclic ether structure, units having a cyclic ether structure and units based on a monomer having at least two polymerizable unsaturated bonds.

[2] The electrolyte material according to [1], wherein the molar ratio of units based on a monomer having at least two polymerizable unsaturated bonds to units based on tetrafluoroethylene is from $4.3\times10^{-4}$ to $9.9\times10^{-3}$.

[3] The electrolyte material according to [1] or [2], wherein the molar ratio of units based on a monomer having at least two polymerizable unsaturated bonds to units having a cyclic ether structure is from $6.7\times10^{-4}$ to $9.9\times10^{-3}$.

[4] The electrolyte material according to any one of [1] to [3], wherein the content of units based on a monomer having at least two polymerizable unsaturated bonds is from 0.001 to 10 mol % relative to all the units constituting the polymer having ion exchange groups.

[5] The electrolyte material according to any one of [1] to [4], wherein the units having a cyclic ether structure are at least one species of units selected from the group consisting units represented by the formula (u11) described later, units represented by the formula (u12) described later, units represented by the formula (u21) described later, units represented by the formula (u22) described later and units represented by the formula (u24) described later:

wherein in the formula (u11), $R^{11}$ is a bivalent perfluoroalkylene group which may have an ethereal oxygen atom, each of $R^{12}$, $R^{13}$, $R^{15}$ and $R^{16}$ is independently a monovalent perfluoroalkyl group which may have an ethereal oxygen atom or a fluorine atom, $R^{14}$ is a monovalent perfluoroalkyl group which may have an ethereal oxygen atom, a fluorine atom or a group represented by $—R^{11}(SO_2X(SO_2R^f)_a)^-M^+$ wherein $M^+$ is $H^+$, a monovalent metal cation or an ammonium ion which may have at least one hydrocarbon group instead of a hydrogen atom, $R^f$ is a linear or branched perfluoroalkyl group which may have an ethereal oxygen atom, and X is an oxygen atom, a nitrogen atom or a carbon atom, and when X is an oxygen atom, a=0, when X is a nitrogen atom, a=1, and when X is a carbon atom, a=2, in the formula (u12), $R^{21}$ is a $C_{1-6}$ perfluoroalkylene group or a $C_{2-6}$ perfluoroalkylene group which has an ethereal oxygen atom between carbon atoms, $R^{22}$ is a fluorine atom, a $C_{1-6}$ perfluoroalkyl group, a $C_{2-6}$ perfluoroalkyl group which has an ethereal oxygen atom between carbon atoms or a group represented by $—R^{21}(SO_2X(SO_2R^f)_a)^-M^+$ wherein $M^+$, $R^f$, X and a are the same as described above, respectively, in the formula (u21), each of $R^{41}$, $R^{42}$, $R^{43}$, $R^{44}$, $R^{45}$ and $R^{46}$ is independently a monovalent perfluoroalkyl group which may have an ethereal oxygen atom or a fluorine atom, in the formula (u22), s is 0 or 1, each of $R^{51}$ and $R^{52}$ is independently a fluorine atom, a $C_{1-5}$ perfluoroalkyl group or $R^{51}$ and $R^{52}$ are bonded together to form a spiro ring (provided that s is 0), each of $R^{53}$ and $R^{54}$ is independently a fluorine atom or a $C_{1-5}$ perfluoroalkyl group, and $R^{55}$ is a fluorine atom, a $C_{1-5}$ perfluoroalkyl group or a $C_{1-5}$ perfluoroalkoxy group, and in the formula (u24), each of $R^{71}$, $R^{72}$, $R^{73}$, $R^{74}$, $R^{75}$ and $R^{76}$ is independently a monovalent perfluoroalkyl group which may have an ethereal oxygen atom or a fluorine atom.

[6] The electrolyte material according to [5], wherein the units having a cyclic ether structure are units represented by the formula (u22).

[7] The electrolyte material according to any one of [1] to [6], wherein the units based on a monomer having at least two polymerizable unsaturated bonds are units represented by the formula (u41) described later:

wherein in the formula (u41), $Q^4$ is an oxygen atom or a bivalent perfluoroalkylene group which may have an ethereal oxygen atom.

[8] The electrolyte material according to [7], wherein the units based on a monomer having at least two polymerizable unsaturated bonds are units represented by at least one of the formula (u41-1), the formula (u41-2) and the formula (u41-3) described later.

[9] The electrolyte material according to any one of [1] to [8], wherein the units having an ion exchange group and no cyclic ether structure are represented by at least one of the formula (u31) and the formula (u32) described later:

wherein in the formula (u31), Z is a fluorine atom or a trifluoromethyl group, q is 0 or 1, m is an integer of from 0 to 3, p is 0 or 1, n is an integer of from 1 to 12, provided that m+p>0, and $M^+$ is $H^+$, a monovalent metal cation or an ammonium ion which may have at least one hydrocarbon group instead of a hydrogen atom, and in the formula (u32), $Q^1$ is a perfluoroalkylene group which may have an ethereal oxygen atom, $Q^2$ is a single bond or a perfluoroalkylene group which may have an ethereal oxygen atom, Y is a fluorine atom or a monovalent perfluoroalkyl group, q is 0 or 1, $R^f$ is a linear or branched perfluoroalkyl group which may have an ethereal oxygen atom, X is an oxygen atom, a nitrogen atom or a carbon atom, and when X is an oxygen atom, a=0, when X is a nitrogen atom, a=1, and when X is a carbon atom, a=2, provided that two or more $R^f$s, if present, may be identical or different.

[10] The electrolyte material according to any one of [1] to [9], wherein the polymer has an ion exchange capacity of from 0.5 to 2.5 meq/g dry resin.

[11] A membrane electrode assembly comprising an anode comprising a catalyst layer comprising a catalyst and an electrolyte material made of a polymer having ion exchange groups, a cathode comprising a catalyst and an electrolyte material made of a polymer having ion exchange groups, and a polymer electrolyte membrane comprising a fluorinated polymer having ion exchange groups sandwiched between the anode and the cathode, wherein at least one of the electrolyte material in the anode and the electrolyte material in the cathode is the electrolyte material as defined in any one of [1] to [10].

[12] A polymer electrolyte fuel cells comprising the membrane electrode assembly as defined in [11].

Advantageous Effects of Invention

According to the present invention, it is possible to provide an electrolyte material which can form catalyst layers resistant to cracking when used in membrane electrode assemblies and enables provision of fuel cells having good power generation characteristics, a membrane electrode assembly and a polymer electrolyte fuel cell.

BRIEF DESCRIPTION OF DRAWINGS

FIG. 1 A cross-sectional view of an embodiment of the membrane electrode assembly.

DESCRIPTION OF EMBODIMENTS

The terms used herein have the following meanings.

A "unit" in a polymer mean an atomic group derived from one molecule of a monomer by polymerization. A unit may be an atomic group directly formed by a polymerization reaction, or may be an atomic group having a partially different structure obtained by polymerization followed by partial modification.

A "precursor group for an ion exchange group" means a group which can be converted to an ion exchange group in the form of an acid or in the form of a salt with a metal cation by treatments such as hydrolysis, if necessary, followed by cation exchange.

A "precursor polymer" means a polymer which has precursor groups for ion exchange groups and can be converted to a polymer having ion exchange groups.

"TQ value" is the volume flow rate value of a polymer and is measured as described in Examples. TQ value is a measure of molecular weight.

A numerical range expressed by using "to" includes the figures before and after "to" as the lower limit and the upper limit.

A unit represented by the formula (u11) is referred to as a unit (u11). Units represented by other formulae are also referred to in the same manner.

A monomer represented by the formula (m11) is referred to as a monomer (m11). Monomers represented by other formulae are also referred to in the same manner.

A unit (u11), a unit (u12), a unit (u21), a unit (u22) and units (u24) are also referred to as a "specific cyclic ether unit", generically.

A monomer (m11), a monomer (m12), a monomer (m21), a monomer (m22) and a monomer (m24) are also referred to as a "specific cyclic monomer", generically.

The content (mol %) of units derived from each monomer in a polymer is calculated from the amount of the monomer fed to produce the polymer.

[Electrolyte Material]

The electrolyte material of the present invention is a polymer having ion exchange groups which comprises units based on tetrafluoroethylene (hereinafter referred to as "units A"), units having an ion exchange group and no cyclic ether structure (hereinafter referred to as "units B"), units having a cyclic ether structure (hereinafter referred to as "units C") and units based on a monomer having at least two polymerizable unsaturated bonds (hereinafter referred to as "units D").

Hereinafter, the polymer constituting the electrolyte material of the present invention is referred to as a "polymer (H)".

The electrolyte material of the present invention can form a crack-resistant catalyst layer and makes it possible to provide a fuel cell with good powder generation characteristics, presumably, though not precisely, because of the presence of both units C and units D in the polymer (H).

The polymer (H) is suitably used as the electrolyte material in catalyst layers in a membrane electrode assembly.

<Units A>

Units A are units based on tetrafluoroethylene (TFE). Units A facilitate water removal from the catalyst layer by imparting water repellency and thereby make it possible to provide a fuel cell with higher power efficiency.

The content of units A is preferably from 1 to 50 mol %, more preferably from 10 to mol %, particularly preferably from 20 to 35 mol %, relative to all the units in the polymer (H).

<Units B>

Units B are units having an ion exchange group and no cyclic ether structure.

Units B are preferably units based on a monomer having an ion exchange group and no cyclic ether structure, more preferably units (u31) or units (u32) to provide a fuel cell with higher power efficiency, particularly preferably units (u32) to provide a fuel cell with even higher power efficiency.

(u31)

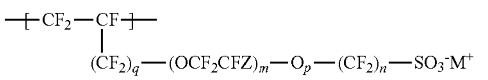

In units (u31), Z is a fluorine atom or a trifluoromethyl group, q is 0 or 1, m is an integer of from 0 to 3, p is 0 or 1, n is an integer of from 1 to 12, provided that m+p>0.

$M^+$ is $H^+$, a monovalent metal cation (such as a potassium ion or a sodium ion) or an ammonium ion which may have at least one hydrocarbon group instead of a hydrogen atom and is preferably $H^+$ for high ionic conductivity.

(u32)

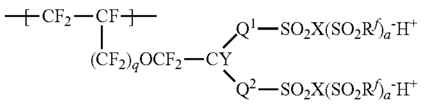

In units (u32), $Q^1$ is a perfluoroalkylene group which may have an ethereal oxygen atom.

$Q^2$ is a single bond or a perfluoroalkylene group which may have an ethereal oxygen atom.

The number of ethereal oxygen atoms, if present, in the perfluoroalkylene group as $Q^1$ or $Q^2$ may be 1 or at least two. Such an ethereal oxygen atom may be inserted between carbon atoms in the perfluoroalkylene group or may be bonded to a terminal carbon atom.

The perfluoroalkylene group may be linear or branched and is preferably linear. The number of carbon atoms in the perfluoroalkylene group is preferably from 1 to 6, particularly preferably from 1 to 4. When the number of carbon atoms is at most 6, the fluorine-containing monomer as the precursor of such units has a low boiling point and is easy to purify by distillation, and the polymer (H) has good proton conductivity without sacrifice of ion exchange capacity.

$Q^2$ is preferably a $C_{1-6}$ perfluoroalkylene group which may have an ethereal oxygen atom. When $Q^2$ is a $C_{1-6}$ perfluoroalkylene group which may have an ethereal oxygen atom, it is possible to provide a fuel cell which shows stabler power generation characteristics during a long period of operation, than when $Q^2$ is a single bond.

It is preferred that at least one of $Q^1$ and $Q^2$ is a $C_{1-6}$ perfluoroalkylene group which has an ethereal oxygen atom. A monomer having $C_{1-6}$ perfluoroalkylene group which has an ethereal oxygen atom is easy to obtain in a high yield because it can be synthesized without the necessity for fluorination with a fluorine gas.

Y is a fluorine atom or a monovalent perfluoroalkyl group. Y is preferably a fluorine atom or a $C_{1-6}$ linear perfluoroalkyl group which may have an ethereal oxygen atom, particularly preferably a fluorine atom to achieve a high density of functional groups ($-(SO_2X(SO_2R^f)_a)-H^+$).

q is 0 or 1.

$R^f$ is a linear or branched perfluoroalkyl group which may have an ethereal oxygen atom. The number of carbon atoms in the perfluoroalkyl group is preferably from 1 to 8, particularly preferably from 1 to 6. When two or more R's are present, they may be identical to or different from one another.

X is an oxygen atom, a nitrogen atom or a carbon atom, and a is 0 when X is an oxygen atom, a is 1 when X is a nitrogen atom, and a is 2 when X is a carbon atom.

Units (u32) are preferably units (u32-1) to (u32-3), particularly units (u32-1), for easy production on an industrial scale.

(u32-1)

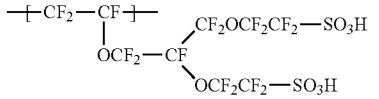

(u32-2)

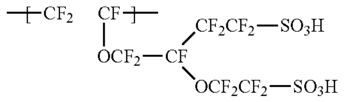

(u32-3)

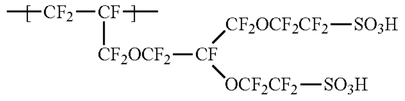

The content of units B is preferably from 30 to 85 mol %, more preferably from 40 to 75 mol %, particularly preferably from 45 to 70 mol %, relative to all the units in the polymer (H). It is advantageous to secure a sufficient ion exchange capacity and a sufficient ionic conductivity that the content of units B is at the above-mentioned lower limit or above, and it is advantageous to suppress swelling of the polymer, flooding of the catalyst layer and provide a membrane electrode assembly with good power generation characteristics even at low temperatures at high humidities.

The polymer (H) may comprise only one species of units B or two or more species of units B. In the latter case, the content of such units means the total content of these species.

<Units C>

Units C are units having a cyclic ether structure.

Units C are preferably specific cyclic ether units shown below for provision of a catalyst layer with higher oxygen permeability.

(u11)

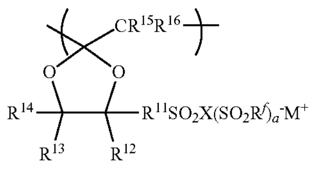

In units (u11), $R^{11}$ is a bivalent perfluoroalkylene group which may have an ethereal oxygen atom. The number of ethereal oxygen atoms, if present, in the perfluoroalkylene group may be 1 or at least two. Such an ethereal oxygen atom may be inserted between carbon atoms in the perfluoroalkyl group or may be bonded to a terminal carbon atom. The perfluoroalkylene group may be linear or branched, and is preferably linear.

Each of $R^{12}$, $R^{13}$, $R^{15}$ and $R^{16}$ is independently a monovalent perfluoroalkyl group which may have an ethereal oxygen atom or a fluorine atom. It is preferred that at least one of $R^{15}$ and $R^{16}$ is a fluorine atom, and it is more preferred that both are fluorine atoms, in view of polymerizability.

$R^{14}$ is a monovalent perfluoroalkyl group which may have an ethereal oxygen atom, a fluorine atom or a group represented by $—R^{11}(SO_2X(SO_2R^f)_a)^-M^+$. The number of ethereal oxygen atoms, if present, in the perfluoroalkyl group may be 1 or at least two. Such an ethereal oxygen atom may be inserted between carbon atoms in the perfluoroalkyl group or may be bonded to a terminal carbon atom. The perfluoroalkyl group may be linear or branched and is preferably linear. When the formula (u11) contains two $R^{11}$'s, they may be identical to or different from each other.

$M^+$ is $H^+$, a monovalent metal cation (such as a potassium ion or a sodium ion) or ammonium ion which may have at least one hydrocarbon group (such as a methyl group or an ethyl group) instead of a hydrogen atom and is preferably $H^+$ for high ionic conductivity. When the formula (u11) contains two M's, they may be identical to or different from each other.

$R^f$ is a linear or branched perfluoroalkyl group which may have an ethereal oxygen atom. The number of carbon atoms in the perfluoroalkyl group is preferably from 1 to 8, particularly preferably from 1 to 6. When the formula (u11) contains two or more $R^f$'s, they may be identical to or different from one another.

X is an oxygen atom, a nitrogen atom or a carbon atom, and a is 0 when X is an oxygen atom, a is 1 when X is a nitrogen atom, and a is 2 when X is a carbon atom.

As the $—(SO_2X(SO_2R^f)_a)^-M^+$ group, a sulfonic acid group (a $—SO_3^-M^+$ group), a sulfonimide group (a $—SO_2N(SO_2R^f)^-M^+$ group) or a sulfone methide group (a $—SO_2C(SO_2R^f)_2)^-M^+$ group) may be mentioned specifically.

Units (u11) are preferably units (u11-1). $M^+$ in units (u11-1) is the same as $M^+$ in the formula (u11).

(u11-1)

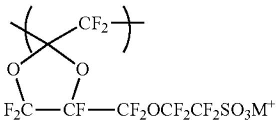

(u12)

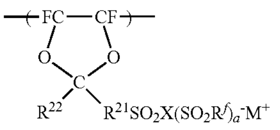

In units (u12), $R^{21}$ is a $C_{1-5}$ perfluoroalkylene group or a $C_{2-6}$ perfluoroalkylene group which has an ethereal oxygen atom between carbon atoms. The number of ethereal oxygen atoms, if present, in the perfluoroalkylene group may be 1 or at least two. The perfluoroalkylene group may be linear or branched and is preferably linear.

$R^{22}$ is a fluorine atom, a $C_{1-6}$ perfluoroalkyl group, a $C_{2-6}$ perfluoroalkyl group which may have an ethereal oxygen atom between carbon atoms or a group represented by $—R^{21}(SO_2X(SO_2R^f)_a)^-M^+$. The number of ethereal oxygen atoms, if present, in the perfluoroalkyl group may be 1 or at least two. The perfluoroalkyl group may be linear or branched and is preferably linear. When the formula (u12) contains two $R^{21}$'s, they may be identical to or different from each other.

$M^+$, $R^f$, X and a are the same as $M^+$, $R^f$, X and a in the formula (u11), respectively.

As specific examples of units (u12), units (u12-1) and units (u12-2) may be mentioned. In the formulae, $M^+$ is the same as $M^+$ in the formula (u11).

(u12-1)

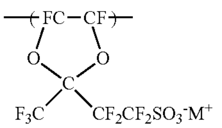

(u12-2)

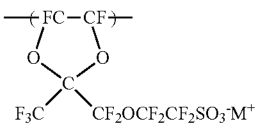

(u21)

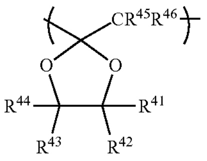

In units (u21), each of $R^{41}$, $R^{42}$, $R^{43}$, $R^{44}$, $R^{45}$ and $R^{46}$ is independently a monovalent perfluoroalkyl group which may have an ethereal oxygen atom or a fluorine atom. The number of ethereal oxygen atoms, if present, in the perfluoroalkyl group may be 1 or at least two. Such an ethereal oxygen atom may be inserted between carbon atoms in the perfluoroalkyl group or may be bonded to a terminal carbon atom. The perfluoroalkyl group may be linear or branched and is preferably linear.

It is preferred that at least one of $R^{45}$ and $R^{46}$ is a fluorine atom, and it is more preferred that both are fluorine atoms, in view of polymerizability.

Units (u21) are preferably units (u21-1).

(u21-1)

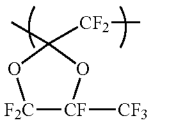

(u22)

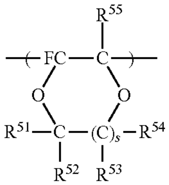

In units (u22), s is 0 or 1, preferably 0.

Each of $R^{51}$ and $R^{52}$ is independently a fluorine atom or a $C_{1-5}$ perfluoroalkyl group or $R^{51}$ and $R^{52}$ are bonded together to form a spiro ring (when s is 0).

Each of $R^{53}$ and $R^{54}$ is independently a fluorine atom or a $C_{1-5}$ perfluoroalkyl group.

$R^{55}$ is a fluorine atom, a $C_{1-5}$ perfluoroalkyl group or a $C_{1-5}$ perfluoroalkoxy group. $R^{55}$ is preferably a fluorine atom in view of polymerizability.

The perfluoroalkyl group and the perfluoroalkoxy group may be linear or branched and are preferably linear.

Units (u22) are preferably units (u22-1).

(u22-1)

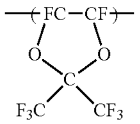

(u24)

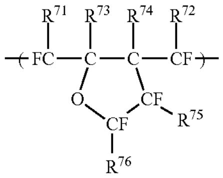

In units (u24), each of $R^{71}$ to $R^{75}$ is independently a monovalent perfluoroalkyl group which may have an ethereal oxygen atom or a fluorine atom. The number of ethereal oxygen atoms, if present, in the perfluoroalkyl group may be 1 or at least two. Such an ethereal oxygen atom may be inserted between carbon atoms in the perfluoroalkyl group or may be bonded to a terminal carbon atom. The perfluoroalkyl group may be linear or branched and is preferably linear.

$R^{71}$ to $R^{74}$ are preferably fluorine atoms in view of polymerizability.

Units C preferably comprise units of at least one species of units selected from the group consisting of units (u21), units (u22) and units (u24) for provision of a catalyst layer with higher oxygen permeability, and are particularly preferably units (u22).

The lower limit of the content of units C is preferably 1 mol %, more preferably 5 mol %, particularly preferably 10 mol %, relative to all the units in the polymer (H), for provision of fuel cells with good power generation characteristics.

The upper limit of the content of units C is preferably 50 mol %, more preferably 40 mol %, particularly preferably 30 mol %, relative to all the units in the polymer (H), for formation of crack-resistant catalyst layers and provision of fuel cells with good power generation characteristics.

The polymer (H) may comprise only one species of units C or two or more species of units C. In the latter case, the content of such units means the total content of these species.

<Units D>

Units D are units based on a monomer having at least two polymerizable unsaturated bonds. In the present invention, units based on a monomer having a cyclic ether structure and at least two polymerizable unsaturated bonds are categorized as units D.

Examples of polymerizable unsaturated bonds are double bonds between carbon atoms (C═C) and triple bonds between carbon atoms (C≡C).

The number of polymerizable unsaturated bonds in a monomer having at least two polymerizable unsaturated bonds is preferably from 2 to 6, more preferably 2 or 3, particularly preferably 2, in view of polymerizability.

The monomer having at least two polymerizable unsaturated bonds is preferably a fluorine-containing monomer, more preferably a perfluoromonomer.

Units D are preferably units represented by the formula (u41) for formation of crack-resistant catalyst layers. A unit represented by the formula (u41) may crosslink two polymer chain or may be present in a single polymer chain.

(u41)

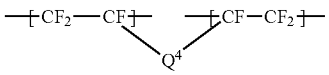

In the formula (u41), $Q^4$ is an oxygen atom or a bivalent perfluoroalkylene group which may have an ethereal oxygen atom.

The number of ethereal oxygen atoms, if present, in the perfluoroalkylene group as $Q^4$ may be 1 or at least two. Such an ethereal oxygen atom may be inserted between carbon atoms in the perfluoroalkylene group or may be bonded to a terminal carbon atom.

The perfluoroalkylene group may be linear or branched and is preferably linear. The number of carbon atoms in the perfluoroalkylene group is preferably from 1 to 10, more preferably from 2 to 8, particularly preferably 3 or 4.

As specific examples of units D, units (u41-1), units (u41-2) and units (u41-3) may be mentioned. Units (u41-2) are preferred for formation of crack-resistant catalyst layers.

(u41-1)

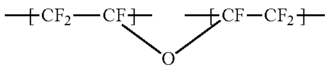

(u41-2)

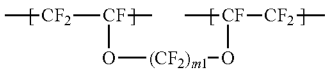

(u41-3)

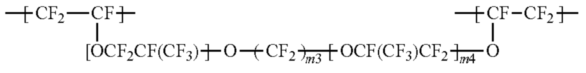

In the above units, m1 and m3 are integers of from 2 to 8, particularly preferably 3 or 4.

In the above units, each of m2 and m4 is independently an integer of from 0 to 5, provided that m2+m421.

The lower limit of the content of units D is preferably 0.001 mol %, more preferably 0.005 mol %, particularly preferably 0.01 mol %, relative to all the units in the polymer (H), for formation of crack-resistant catalyst layers.

The upper limit of the content of units D is preferably 10 mol %, more preferably 5 mol %, further preferably 1 mol %, particularly preferably 0.2 mol %, relative to all the units in the polymer (H), for good power generation characteristics.

The polymer (H) may comprise only one species of units D or two or more species of units D. In the latter case, the content of such units means the total content of these species.

<Optional Units>

The polymer (H) may comprises units other than those mentioned above (hereinafter referred to as "optional units"). Specific examples of such units include units based on such a monomer as perfluoro(3-butenyl vinyl ether), perfluoro(allyl vinyl ether), a perfluoro α-olefin (like hexafluoropropylene) or a perfluoro(alkyl vinyl ether).

<Relative Contents>

The molar ratio of units D to units A in the polymer (H) (units D/units A) is preferably from $4.3\times10^{-4}$ to $9.9\times10^{-3}$, more preferably from $7.2\times10^{-4}$ to $7.5\times10^{-3}$, particularly preferably from $1.0\times10^{-3}$ to $5.0\times10^{-3}$, further preferably from $1.5\times10^{-3}$ to $3.3\times10^{-3}$, even further preferably from $1.5\times10^{-3}$ to $3.2\times10^{-3}$.

When the molar ratio (units D/units A) is $4.3\times10^{-4}$ or above, the polymer (H) has a sufficiently high molecular weight. When the molar ratio (units D/units A) is $9.9\times10^{-3}$ or below, the polymer (H) is easy to produce.

Especially, when the molar ratio (units D/units A) is within the range of from $1.5\times10^{-3}$ to $3.2\times10^{-3}$, more crack-resistant catalyst layers are formed, and fuel cells having better powder generation characteristics are provided.

The molar ratio of units D to units C in the polymer (H) (units D/units C) is preferably from $6.7\times10^{-4}$ to $9.9\times10^{-3}$, more preferably from $8.4\times10^{-4}$ to $7.7\times10^{-3}$, particularly preferably from $1.0\times10^{-3}$ to $5.5\times10^{-3}$, further preferably from $1.4\times10^{-3}$ to $2.5\times10^{-3}$.

When the molar ratio (units D/units C) is $6.7\times10^{-4}$ or above, the polymer (H) has a sufficiently high molecular weight. When the molar ratio (units D/units C) is $9.9\times10^{-3}$ or below, the polymer (H) is easy to produce.

Especially, when the molar ratio (units D/units C) is within the range of from $1.4\times10^{-3}$ to $2.5\times10^{-3}$, more crack-resistant catalyst layers are formed, and fuel cells having better powder generation characteristics are provided.

<Physical Properties>

The ion exchange capacity of the polymer (H) is preferably at least 0.5 meq/g dry resin, more preferably at least 0.9 meq/g dry resin, particularly preferably at least 1.1 meq/g dry resin, further preferably at least 1.3 meq/g dry resin. The ion exchange capacity of the polymer (H) is preferably at most 2.5 meq/g dry resin, more preferably at most 2.0 meq/g dry resin, particularly preferably at most 1.6 meq/g dry resin, further preferably at most 1.5 meq/g dry resin. When the ion exchange capacity is at the lower limit or above, the polymer (H) has high ionic conductivity and can form a catalyst layer which can achieve a sufficient power output when used in a fuel cell. When the ion exchange capacity is at the upper limit or below, the polymer is easy to synthesize.

A particularly preferred embodiment of the polymer (H) comprises units represented by the formula (u22) as units C and has an ion exchange capacity of at least 1.3 meq/g dry resin. When such an embodiment of the polymer (H) is used in catalyst layers of a fuel cell, the fuel cell has particularly excellent power generation characteristics.

The Q value of the polymer (H) is preferably from 1 to 500 $mm^3$/sec, more preferably from 10 to 300 $mm^3$/sec, particularly preferably from 20 to 100 $mm^3$/sec. When the Q value is 1 $mm^3$/sec or above, the polymer (H) dissolves or disperses well and easily form a liquid composition as described later. When the Q value is 500 $mm^3$/sec or below, the polymer (H) has a sufficiently high molecular weight and high mechanical strength.

Q value is defined as the volume of a polymer having a TQ value higher than 300° C. extruded per unit time (flow rate) at 300° C., and among polymers having the same composition, a polymer having a smaller Q value has a higher molecular weight.

<Production of Polymer (H)>

The polymer (H) may be produced, for example, by polymerizing TFE, a perfluoromonomer having a precursor group for an ion exchange group and no cyclic ether structure, a cyclic monomer (preferably a particular cyclic monomer) and a monomer having at least two polymerizable unsaturated bonds and converting the precursor groups for ion exchange groups in the resulting polymer (F) to ion exchange groups. A precursor group for an ion exchange group means a group which can be converted to an ion exchange group by treatment such as hydrolysis as described latter, and when the ion exchange group is a sulfonic acid group ($—SO_3H$), the precursor group is a fluorosulfonyl group ($—SO_2F$).

Each monomer which may be used for production of the polymer (H) will be described below.

(Perfluoromonomer Having a Precursor Group for an Ion Exchange Group and No Cyclic Ether Group)

The perfluoromonomer having a precursor group for an ion exchange group and no cyclic ether structure may, for example, be a monomer (m31) or a monomer (m32) and is preferably a monomer (m32) in order to provide a fuel cell with better power generation characteristics.

$$CF_2{=}CF(CF_2)_q(OCF_2CFZ)_mO_p(CF_2)_nSO_2F \qquad (m31)$$

The monomer (m31) corresponds to units (u31).

Z, q, m, p and n are the same as Z, q, m, p and n in the formula (u31), respectively.

As the monomer (m31), monomers (m31-1) to (m31-4) may be mentioned preferably.

$$CF_2{=}CFO(CF_2)_{n1}SO_2F \qquad (m31\text{-}1)$$

$$CF_2{=}CFCF_2O(CF_2)_{n4}SO_2F \qquad (m31\text{-}2)$$

$$CF_2{=}CF(OCF_2CF(CF_3))_{m3}O(CF_2)_{n3}SO_2F \qquad (m31\text{-}3)$$

$$CF_2{=}CFOCF_2CF(CF_3)O(CF_2)_{n2}SO_2F \qquad (m31\text{-}4)$$

n1, n2, n3 and n4 are integers of from 1 to 12, and m3 is an integer of from 1 to 3.

The monomer (m31) may be synthesized, for example, in accordance with Prog. Polym. Sci., vol. 12, 1986, p. 233-237 or U.S. Pat. No. 4,330,654.

(m32)

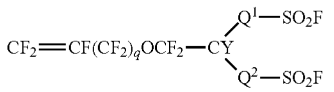

$Q^1$, $Q^2$, Y and q in the monomer (m32) are the same as $Q^1$, $Q^2$, Y and q in the formula (u32), respectively.

The monomer (m32) corresponds to units (u32).

As the monomer (m32), monomers (m32-1) to (m32-3) are preferred for easy production of the polymer (H) on an industrial scale, and a monomer (m32-1) is particularly preferred.

(m32-1)

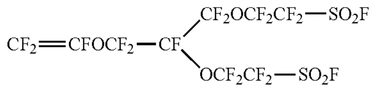

(m32-2)

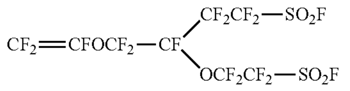

-continued (m32-3)

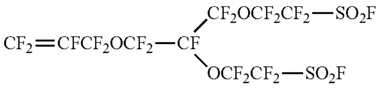

The monomer (m32) may be synthesized, for example, in accordance with WO2007/013533 or JP-A-2008-202039.

[0072]

(Cyclic Monomer)

Units (u11) are derived from a monomer (m11) by polymerization, preferred examples of the monomer (m11) are monomers (m11-1) to (m11-4). The monomer (m11) may be synthesized by a known method.

In the formula (m11), $R^{11}$ to $R^{16}$ are the same as $R^{11}$ to $R^{16}$ in the formula (u11), respectively.

(m11)

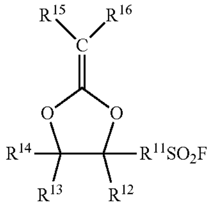

(m11-1)

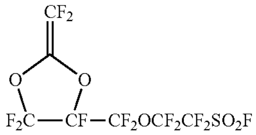

(m11-2)

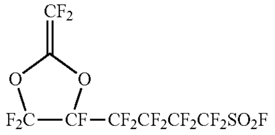

(m11-3)

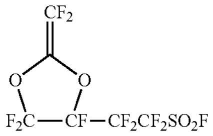

(m11-4)

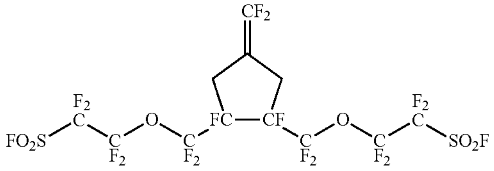

Units (u12) are derived from a monomer (m12) by polymerization, and preferred examples of the monomer (m12) are monomers (m12-1) and (m12-2). The monomer (m12) may be synthesized by a known method.

In the formula (m12), $R^{21}$ and $R^{22}$ are the same as $R^{21}$ and $R^{22}$ in the formula (u12), respectively.

(m12)

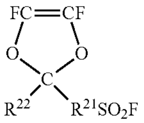

(m12-1)

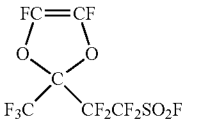

(m12-2)

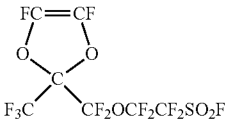

Units (u21) are derived from a monomer (m21) by polymerization, and preferred examples of the monomer (m21) are monomers (m21-1) and (m21-2). The monomer (m21) may be synthesized by a known method.

In the formula (m21), $R^{41}$ to $R^{46}$ are the same as $R^{41}$ to $R^{48}$ in the formula (u21), respectively.

(m21)

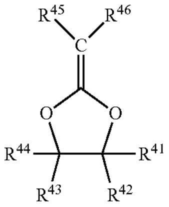

(m21-1)

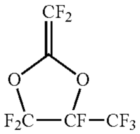

(m21-2)

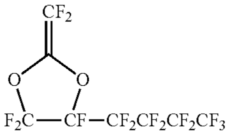

Units (u22) are derived from a monomer (m22) by polymerization, and preferred examples of the monomer (m22) are monomers (m22-1) to (m22-11). The monomer (m22) may be synthesized by a known method.

In the formula (m22), $R^{51}$ to $R^{55}$ and s are the same as $R^{51}$ to $R^{55}$ and s in the formula (u22), respectively.

(m22)

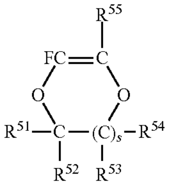

-continued (m22-1)

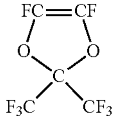

(m22-2)

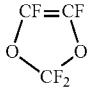

(m22-3)

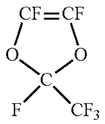

(m22-4)

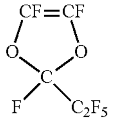

(m22-5)

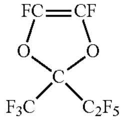

(m22-6)

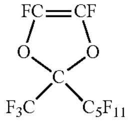

(m22-7)

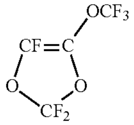

(m22-8)

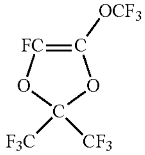

(m22-9)

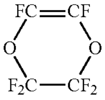

(m22-10)

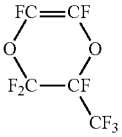

(m22-11)

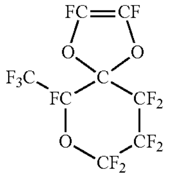

Units (u24) are derived from a monomer (m24) by cyclization polymerization, and preferred examples of the monomer (m24) are monomers (m24-1) to (m24-3). The monomer (m24) may be synthesized by a known method.

In formula (m24), $R^{71}$ to $R^{76}$ are the same as $R^{71}$ to $R^{76}$ in the formula (u24), respectively.

(m24)

$$CF(R^{71})=C(R^{73})-O-CF(R^{76})-CF(R^{75})-C(R^{74})=CF(R^{72})$$

(m24-1)

$$CF_2=CF-O-CF_2-CF_2-CF=CF_2$$

(m24-2)

$$CF_2=CF-O-CF_2-CF(CF_3)-CF=CF_2$$

(m24-3)

$$CF_2=CF-O-CF(CF_3)-CF_2-CF=CF_2$$

(Monomer Having at Least Two Polymerizable Unsaturated Bonds)

As the monomer having at least two polymerizable unsaturated bonds, a monomer (m41) may be mentioned.

(m41)

$$(CF_2=CF)_2Q^4$$

The monomer (m41) corresponds to units (u41).

$Q^4$ in the formula (m41) is the same as $Q^4$ in the formula (u41).

As the monomer (m41), monomers (m41-1) to (m41-3) may be mentioned preferably.

(m41-1)

$$CF_2=CF-O-CF=CF_2$$

(m41-2)

$$CF_2=CF-O-(CF_2)_{m1}-O-CF=CF_2$$

(m41-3)

$$CF_2=CF-[OCF_2CF(CF_3)]_{m2}-O-(CF_2)_{m3}-[OCF(CF_3)CF_2]_{m4}-O-CF=CF_2$$

The monomers (m41-1) to (m41-3) correspond to units (u41-1) to (u41-3), respectively.

m1 in the formula (m41-2) is the same as m1 in the formula (u41-2).

m2, m3 and m4 in the formula (m41-3) is the same as m2, m3 and m4 in the formula (u41-3), respectively.

How to convert precursor groups for ion exchange groups to ion exchange groups will be described in reference to $-SO_2F$ as precursor groups.

The following method (i) is available for conversion of groups represented by $-SO_2F$ to sulfonic acid groups ($-SO_3^-H^+$), and the following method (ii) is available for conversion of groups represented by $-SO_2F$ to sulfonimide groups ($-SO_2N(SO_2R^f)^-H^+$).

(i) A method comprising hydrolysis of groups represented by $-SO_2F$ into salt-form sulfonic acid groups and conversion of the sulfonic acid groups from the salt form to acid-form sulfonic acid groups.

(ii) A method comprising imidation of groups represented by $-SO_2F$ into salt-form sulfonimide groups and conversion of the sulfonimide groups to the acid-form.

Method (i):

The hydrolysis is carried out, for example, by bringing a precursor polymer having groups represented by $-SO_2F$ with a basic compound in a solvent. As the basic compound, sodium hydroxide, potassium hydroxide or the like may be mentioned. As the solvent, water, a solvent mixture of water and a polar solvent or the like may be mentioned. As the polar solvent, an alcohol (such as methanol or ethanol), dimethyl sulfoxide or the like may be mentioned.

The conversion to the acid form may be carried out, for example, by bringing the polymer having salt-form sulfonic acid groups into contact with an aqueous solution of hydrochloric acid, sulfuric acid or the like. The hydrolysis and the conversion to the acid form are usually carried out at 0 to 120° C.

Method (ii):

For the imidation, the following methods may be mentioned.

(ii-1) A method comprising reacting groups represented by $—SO_2F$ with $R^fSO_2NHM$.

(ii-2) A method comprising reacting groups represented by $—SO_2F$ with $R^fSO_2NH_2$ in the presence of an alkali metal hydroxide, an alkali metal carbonate, MF, ammonia or a primary to tertiary amine.

(ii-3) A method comprising reacting groups represented by $—SO_2F$ with $R^fSO_2NMSi(CH_3)_3$.

M is an alkali metal or a primary to quaternary ammonium.

The conversion to the acid form is carried out by treating a polymer having salt-form sulfonimide groups with an acid (such as sulfuric acid, nitric acid or hydrochloric acid).

When the ion exchange groups are sulfonimide groups, the polymer (H) may also be produced by converting a group represented by $—SO_2F$ in a monomer (m11), (m12), (m31) or (m32) to a sulfonimide group before polymerization.

The monomer having a sulfonimide group instead of a group represented by $—SO_2F$ may be obtained by addition of chlorine or bromine to the carbon-carbon double bond in a monomer (m11), (m12), (m31) or (m32), conversion of group represented by $—SO_2F$ by the method (ii) and dichlorination or debromination with metallic zinc.

[Membrane Electrode Assembly]

The membrane-electrode assembly of the present invention comprises an anode comprising a catalyst layer comprising a catalyst and an electrolyte material made of a polymer having ion exchange groups, a cathode comprising a catalyst and an electrolyte material made of a polymer having ion exchange groups, and a polymer electrolyte membrane comprising a fluorinated polymer having ion exchange groups sandwiched between the anode and the cathode.

At least one of the electrolyte material in the anode and the electrolyte material in the cathode is an electrolyte material made of the polymer (H).

FIG. 1 is a cross-sectional view of an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and a polymer electrolyte membrane 15 sandwiched between the anode 13 and the cathode 14, in contact with the catalyst layers 11.

The anode and cathode are sometimes referred to as "electrodes", collectively.

[Electrodes (Anode and Cathode)]

The anode and the cathode each have a catalyst layer 11 and a gas diffusion layer 12.

<Catalyst Layer>

At least one of the electrolyte material in the catalyst layer 11 in the anode 13 and the electrolyte material in the catalyst layer 11 in the cathode 14 is made of the polymer (H), and both electrolyte materials may be made of the polymer (H). When the electrolyte material in either catalyst layer 11 is made of the polymer (H), and the electrolyte material in the other catalyst layer 11 is not made of the polymer (H), the proton conductive polymer in the latter catalyst layer 11 is preferably a polymer (S), which will be described later.

In the membrane electrode assembly of the present invention, it is preferred that at least the electrolyte material in the cathode is made of the polymer (H), in view of gas permeability.

The thickness of a catalyst layer is preferably from 1 to 20 μm, particularly preferably from 3 to 10 μm, for easy gas diffusion in the catalyst layer and provision of a fuel cell with higher power generation characteristics.

The thickness of a catalyst is measured by observing a cross-section of the catalyst layer, and ten measurements at ten different points were averaged.

(Catalyst)

As the catalyst in catalyst layers, a supported catalyst comprising platinum or a platinum alloy held on a carbon support may, for example, be mentioned.

The carbon support may, for example, be carbon black powder, graphitized carbon, carbon fibers or carbon nanotubes.

The platinum alloy is preferably an alloy of platinum with at least one metal selected from the groups consisting of metals of the platinum group other than platinum (such as ruthenium, rhodium, palladium, osmium and iridium), gold, silver, chromium, iron, titanium, manganese, cobalt, nickel, molybdenum, tungsten, aluminum, silicon, zinc and tin.

In the case of a supported catalyst, the amount of the catalyst is preferably from to 80 mass %, particularly preferably from 10 to 70 mas %, relative to the total mass of the supported catalyst, in view of the power efficiency of a fuel cell and cost.

<Gas Diffusion Layer>

The gas diffusion layers 12 have a function to uniformly diffuse gas through the catalyst layers 11 and a function as current collectors.

The gas diffusion layers 12 may, for example, be carbon paper, carbon cloth or carbon felt. The gas diffusion layers 12 preferably have a water-repellent finish of polytetrafluoroethylene or the like.

Although the membrane electrode assembly 10 shown in FIG. 1 comprises gas diffusion layers 12, gas diffusion layers are optional, and hence the membrane electrode assembly may comprise no gas diffusion layers.

<Optional Components>

The anode 13 and the cathode 14 may have optional components other than those described above.

As such optional components, carbon layers (not shown) may be provided between the catalyst layers 11 and the gas diffusion layers 12 to facilitate diffusion of gas to the surfaces of the catalyst layers 11 and improve the power generation characteristics of the fuel cell.

The carbon layers contain, for example, carbon and a nonionic fluoroolymer. A preferred example of the carbon is a carbon nanofiber having a diameter of from 1 to 1,000 nm and a fiber length of at most 1,000 μm. The nonionic fluoropolymer may, for example, be polytetrafluoroethylene.

<Formation of Catalyst Layers>

The catalyst layers 11 may be formed by known methods.

[Polymer Electrolyte Membrane]

The polymer electrolyte membrane 5 is made of a fluoropolymer having ion exchange groups (hereinafter referred to as a "polymer (S)").

The polymer (S) is a fluorinated polymer having ion exchange groups and preferably comprises the above-mentioned units based a perfluoromonomer which may be contained as units B in the polymer (H), for high chemical resistance.

As units based on a perfluoromonomer in the polymer (S), unis (u31) and units (u32) may, for example, be mentioned specifically, and units (u32) are particularly preferred for provision of a fuel cell with better power generation characteristics.

The content of units based on a perfluoromonomer is preferably from 5 to 40 mol %, more preferably from 10 to 35 mol %, particularly preferably from 15 to 30 mol %, relative to all the units in the polymer (S).

The polymer (S) may comprise one species of units based on a perfluoromonomer or two or more species of units based on a perfluoromonomer. In the latter case, the content means the total content of these species.

The polymer (S) may further comprise units based on tetrafluoroethylene (TFE).

The content of units based on tetrafluoroethylene is preferably from 50 to 90 mol %, more preferably from 60 to 85 mol %, particularly preferably from 65 to 80 mol %, relative to all the units in the polymer (S).

The polymer (S) may comprise units other than those mentioned above (hereinafter referred to as "optional units"). Specific examples of such units are the same as optional units in the polymer (H).

The ion exchange capacity of the polymer (S) is preferably from 1.10 to 3.0 meq/g dry resin, more preferably from 1.20 to 3.0 meq/g dry resin, particularly preferably from 1.25 to 2.5 meq/g dry resin.

When the ion exchange capacity is at the lower limit of the above-mentioned range or above, the polymer (S) has sufficiently high ionic conductivity to achieve a sufficient power output when the membrane electrode assembly is used in a fuel cell. When the ion exchange capacity is at the upper limit of the above-mentioned range or below, the polymer (S) can form a mechanically strong polymer electrolyte membrane which hardly swells upon hydration, and a polymer electrolyte cell which is unlikely to flood can be provided.

The precursor polymer (S) for the polymer (S) preferably has a TQ value of from 200 to 350° C., more preferably from 210 to 340° C., particularly preferably from 220 to 330° C.

When the TQ value is at the lower limit of the above-mentioned range or above, the polymer (S) has a sufficiently high molecular weight and high mechanical strength. When the TQ value is at the upper limit of the above-mentioned range or below, the polymer (S) dissolves or disperses well and easily form a liquid composition containing the polymer (S).

The TQ value of the precursor polymer (S) is measured as described later in the section entitled Examples.

(Production of Polymer (S))

The polymer (S) may be produced, for example, by polymerizing a monomer having a precursor group for an ion exchange group and converting the precursor groups for ion exchange groups in the resulting polymer to ion exchange groups.

Specific examples of monomers which may be used for production of the polymer (S) include the monomer (m31), the monomer (m32), tetrafluoroethylene, perfluoro(3-butenyl vinyl ether), perfluoro(allyl vinyl ether), perfluoro α-olefins (such as hexafluoropropylene) and perfluoro(alkyl vinyl ethers), which are mentioned for production of the polymer (H).

The precursor groups for ion exchange groups may be converted to ion exchange groups in the same manner as described for production of the polymer (H).

<Other Components>

The polymer electrolyte membrane 15 may further comprise atoms of at least one member selected from the group consisting of cerium and manganese to further improve on durability. Cerium and manganese decompose hydrogen peroxide responsible for deterioration of the polymer electrolyte membrane 15. Cerium and manganese in the polymer electrolyte membrane 15 are preferably in the form of ions, but may be in the form of a hardly soluble salt.

The polymer electrolyte membrane 15 may comprise silica or a heteropoly acid (such as zirconium phosphate, phosphomolybdic acid or phosphotungstic acid) as a humectant.

The polymer electrolyte membrane 15 may be reinforced with a reinforcing material such as a porous body, fibers, a woven fabric or a non-woven fabric. The reinforcing material may be made of polytetrafluoroethylene, a tetrafluoroethylene-hexafluoropropylene copolymer, a tetrafluoroethylene-perfluoro(alkyl vinyl ether) copolymer, polyethylene, polypropylene, polyphenylene sulfide or the like.

<Formation of Polymer Electrolyte Membrane>

The polymer electrolyte membrane 15 may be formed, for example, by applying a liquid composition comprising the polymer (S) onto a base film or a catalyst layer 11 and drying it (casting).

The liquid composition is a dispersion of the polymer (S) in a solvent which comprises either an organic solvent or water or both of them.

(Production of Membrane Electrode Assembly)

The membrane-electrode assembly 10 may be produced, for example, as follows.

(i) By forming catalyst layers 11 on the polymer electrolyte membrane 15 and sandwiching the resulting membrane-catalyst layer assembly between gas diffusion layers 12; or (ii) By forming catalyst layers 11 on gas diffusion layers 12 to form electrodes (an anode 13 and a cathode 14) and sandwiching a polymer electrolyte membrane 15 between the electrodes.

[Polymer Electrolyte Fuel Cell]

The polymer electrolyte fuel cell of the present invention comprises the above-mentioned membrane electrode assembly.

The polymer electrolyte fuel cell of the present invention shows a high power efficiency owing to the use of the above-mentioned membrane electrode assembly.

The polymer electrolyte fuel cell of the present invention may have separators having channels as gas flow paths on both sides of the membrane electrode assembly.

The separators may be made of various electrically conductive material, such as a metal, carbon or a graphite-resin composite.

In the polymer electrolyte fuel cell, an oxygen-containing gas is supplied to the cathode, and a hydrogen-containing gas is suppled to the anode to generate electricity.

Further, the membrane electrode assembly can be applied also to a methanol fuel cell which generates electricity from methanol supplied to the anode.

EXAMPLES

Now, the present invention will be described in further detail with reference to Examples. Examples 1-1 to 1-9 are Preparation Examples, Examples 2-1 to 2-7 are working Examples, while Examples 2-8 to 2-9 are comparative Examples. However, it should be understood that the present invention is by no means restricted thereto.

[Content of Each Species of Units in Polymer]

The content (mol %) of each species of units in a polymer (H) was calculated from the amounts of the respective monomers used for production of the polymer (F). The content of each species of units in a polymer (H) should be the same as that in the corresponding polymer (F).

[Ion Exchange Capacity]

A polymer (F) was dried under vacuum at 210° C. for 16 hours and weighed out into a polycarbonate vessel and immersed in 0.7 N aqueous sodium hydroxide (solvent: water=10/90 (mass ratio)) at 60° C. for at least 72 hours to completely convert the $—SO_2F$ groups in the polymer (F) to $—SO_3Na$ groups. After the polymer (F) was taken out, the amount of sodium hydroxide in the aqueous sodium hydroxide was measured by back titration with 0.1 mol/L hydrochloric acid using phenolphthalein as an indicator, and the ion exchange capacity (meq/g dry resin) was calculated.

The ion exchange capacity of a polymer (H) should be the same as that determined with the polymer (F) as its precursor.

[TQ Value]

By means of a flow tester (CFT-500A, manufactured by Shimadzu Corporation) equipped with a nozzle having a length of 1 mm and an inner diameter of 1 mm, a polymer (F) before hydrolysis to a polymer (H) was melt-extruded at a pressure of 2.94 MPa (gauge pressure) at various temperatures, and the temperature (TQ value) at which the flow rates of the polymer (F) is 100 $mm^3$/second was determined. Among polymers having the same composition, a polymer having a larger TQ value has a higher molecular weight. When the TQ value exceeded 300° C., the flow rate (Q value: $mm^3$/second, 300° C.) was measured, instead.

[Monomers]

In the Preparation Examples, the following monomers were used.

<Monomer Corresponding to Units A>

Tetrafluoroethylene (TFE)

<Monomers Corresponding to Units B>

(m32-1)

Monomer (m32-1)

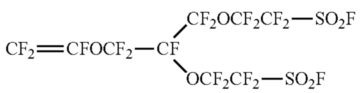

(m31-4)

Monomer (m31-4)

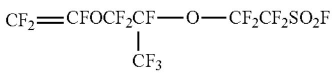

(m31-5)

Monomer (m31-5)

$CF_2{=}CFOCF_2CF_2SO_2F$

<Monomers Corresponding to Units C>

(m22-1)

Monomer (m22-1)

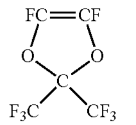

(m24-1)

Monomer (m24-1)

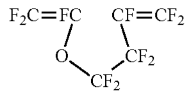

(m21-1)

Monomer (m21-1)

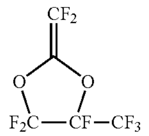

<Monomers Corresponding to Units D>

C4-DVE: $CF_2{=}CF—O—(CF_2)_4—O—CF{=}CF_2$

C3-DVE: $CF_2{=}CF—O—(CF_2)_3—O—CF{=}CF_2$

[Radical Polymerization Initiators]

In the Preparation Examples, the following radical polymerization initiators were used.

PFB: $CF_3CF_2CF_2C({=}O)OOC({=}O)CF_2CF_2CF_3$

IPP: $(CH_3)_2CHOC({=}O)OOC({=}O)OCH(CH_3)_2$

V-601: Dimethyl 2,2'-azobis(2-methylpropionate)

[Solvents]

In the Preparation Examples, the following solvents were used.

HFC-52-13p: $CF_3(CF_2)_4CF_2H$

HCFC-225cb: $CClF_2CF_2CHClF$

HFE-347pc-f: $CF_3CH_2OCF_2CF_2H$

MeOH: $CH_3OH$

EtOH: $C_2H_5OH$

Example 1-1: Preparation Example

<Preparation of Polymer (F-1)>

A 230 mL stainless steel reactor was loaded with 97.4 g of monomer (m32-1), 17.1 g of monomer (m22-1) and 0.06 g of C4-DVE, and after addition of 1.58 g of 2.39 mass % solution of PFB in HFC-52-13p as a radical polymerization initiator, was cooled with liquid nitrogen and degassed sufficiently.

Then, 9.11 g of TFE was fed, and the temperature was raised to 24° C. with stirring at 100 rpm to initiate the polymerization. When the polymerization started, the pressure was 0.32 MPaG. After 24 hours of reaction at a constant inner temperature of 24° C., the reactor was cooled while the gas in the reaction system was purged, to terminate the polymerization. When the reaction was terminated, the pressure was 0.02 MPaG. The remaining monomer (m22-1) was distilled out at 24° C. under reduced pressure for 3 hours to obtain a polymer solution.

The polymer solution was diluted with 202 g of HFC-52-13p, and the polymer was aggregated by addition of 89.6 g of MeOH and collected by filtration. After three washings with a solvent mixture containing HFC-52-13p and MeOH in a 2/1 ratio (mass ratio) and 16 hours of vacuum drying at 210° C., 31.7 g of Polymer (F-1) was obtained. The ion exchange capacity was 1.39 meq/g dry resin.

<Preparation of Polymer (H-1)>

Polymer (F-1) was kept in contact with a reaction liquid comprising 15 mass % of potassium hydroxide, 20 mass % of MeOH and 65 mass % of ultrapure water at 80° C. for 48 hours to hydrolyze —$SO_2F$ groups in the polymer to —$SO_3K$ groups. The polymer was collected by filtration and immersed in ultrapure water at 80° C. to wash off the excess alkali. Then, the —$SO_3K$ group in the polymer were converted to sulfonic acid groups by eight cycles of 0.5 hr of immersion in 3 N aqueous hydrogen chloride at 80° C. followed by filtration and 0.5 hr of immersion in ultrapure water at 80° C. followed by filtration. Then, the polymer was washed with ultrapure water repeatedly until the washings reached pH 7. The polymer was immersed in 10 mass % aqueous hydrogen peroxide at 80° C. for 16 hours midway through the process for the conversion to the acid form. The polymer was dried in a nitrogen atmosphere at room temperature and designated as Polymer (H-1).

<Preparation of Liquid Composition (D-1)>

14.0 g of Polymer (H-1), 68.9 g of EtOH and 44.2 g of ultrapure water (ultrapure water/EtOH=40/60 (mass ratio)) were sealed in a 0.2 L glass autoclave and stirred with a double helical blade at 115° C. for 6 hours at 300 rpm, allowed to cool and filtered through a pressure filtration module (filter paper: PF040 manufactured by ADVANTEC Toyo Kaisha, Ltd.) to obtain a uniform dispersion of Polymer (H-1) in the solvent mixture having a solid content of 11.1 mass %, which was designated as Liquid Composition (D-1).

Example 1-2: Preparation Example

<Preparation of Polymer (F-2)>

A 230 mL stainless steel reactor was loaded with 97.4 g of monomer (m32-1), 17.2 g of monomer (m22-1) and 0.13 g of C4-DVE, and after addition of 36.1 mg of IPP as a radical polymerization initiator, was cooled with liquid nitrogen and degassed sufficiently.

Then, 9.12 g of TFE was fed, and the temperature was raised to 40° C. with stirring at 100 rpm to initiate the polymerization. When the polymerization started, the pressure was 0.42 MPaG. After 24 hours of reaction at a constant inner temperature of 40° C., the reactor was cooled while the gas in the reaction system was purged, to terminate the polymerization. When the reaction was terminated, the pressure was 0.07 MPaG. The remaining monomer (m22-1) was distilled out at 40° C. under reduced pressure for 3 hours to obtain a polymer solution.

The polymer solution was diluted with 204 g of HFC-52-13p, and the polymer was aggregated by addition of 154 g of MeOH and collected by filtration. After three washings with a solvent mixture containing HFC-52-13p and MeOH in a 2/1 ratio (mass ratio) and 16 hours of vacuum drying at 210° C., 23.3 g of Polymer (F-2) was obtained. The ion exchange capacity was 1.54 meq/g dry resin.

<Preparation of Polymer (H-2) and Liquid Composition (D-2)>

Polymer (H-2) and Liquid Composition (D-2) were prepared in the manner as in Example 1-1 except that Polymer (F-2) was used instead of Polymer (F-1).

Example 1-3: Preparation Example

<Preparation of Polymer (F-3)>

A 495 mL stainless steel reactor was loaded with 428 g of monomer (m31-4), 63.4 g of monomer (m22-1) and 0.27 g of C4-DVE, and after addition of 148 mg of IPP as a radical polymerization initiator, was cooled with liquid nitrogen and degassed sufficiently.

Then, 14.6 g of TFE was fed, and the temperature was raised to 40° C. with stirring at 100 rpm to initiate the polymerization. After 24 hours of reaction at a constant inner temperature of 40° C., the reactor was cooled while the gas in the reaction system was purged, to terminate the polymerization. The remaining monomer (m22-1) was distilled out at 24° C. under reduced pressure for 3 hours to obtain a polymer solution.

The polymer solution was diluted with HCFC-225cb, and the polymer was aggregated by addition of hexane and collected by filtration. After three washings with hexane and 16 hours of vacuum drying at 210° C., 83.0 g of Polymer (F-3) was obtained. The ion exchange capacity was 1.16 meq/g dry resin.

<Preparation of Polymer (H-3) and Liquid Composition (D-3)>

Polymer (H-3) and Liquid Composition (D-3) were prepared in the manner as in Example 1-1 except that Polymer (F-3) was used instead of Polymer (F-1).

Example 1-4: Preparation Example

<Preparation of Polymer (F-4)>

A 495 mL stainless steel reactor was loaded with 398 g of monomer (m31-5), 93.9 g of monomer (m22-1) and 0.40 g of C4-DVE, and after addition of 148 mg of IPP as a radical polymerization initiator, was cooled with liquid nitrogen and degassed sufficiently. Then, 21.6 g of TFE was fed, and the temperature was raised to 40° C. with stirring at 100 rpm to initiate the polymerization. After 24 hours of reaction at a constant inner temperature of 40° C., the reactor was cooled while the gas in the reaction system was purged, to terminate the polymerization. The remaining monomer (m22-1) was distilled out at 24° C. under reduced pressure for 3 hours to obtain a polymer solution.

The polymer solution was diluted with HCFC-225cb, and the polymer was aggregated by addition of hexane and collected by filtration. After three washings with hexane and 16 hours of vacuum drying at 210° C., 83.0 g of Polymer (F-4) was obtained. The ion exchange capacity was 1.44 meq/g dry resin.

<Preparation of Polymer (H-4) and Liquid Composition (D-4)>

Polymer (H-4) and Liquid Composition (D-4) were prepared in the manner as in Example 1-1 except that Polymer (F-4) was used instead of Polymer (F-1).

Example 1-5: Preparation Example

<Preparation of Polymer (F-5)>

A 230 mL stainless steel reactor was loaded with 78.9 g of monomer (m32-1), 31.1 g of monomer (m24-1) and 0.06 g of C4-DVE, and after addition of 37.0 g of HFC-52-13p as a polymerization medium, was cooled with liquid nitrogen and degassed sufficiently.

Then, the temperature was raised to 40° C. with stirring at 230 rpm, and 4.20 g of TFE was fed. A solution of 45.5 mg of IPP as a radical polymerization initiator in 3.00 g of HFC-52-13p was injected into the reactor to initiate the polymerization. The reaction was continued for 6 hours while TFE was fed continuously so as not to change the initial pressure, and when the total feed of TFE reached 4.65 g, the reactor was cooled while the gas in the reaction system was purged, to terminate the polymerization. As a result a polymer solution was obtained.

The polymer solution was diluted with HFC-52-13p, and the polymer was aggregated by addition of HFE-347pc-f and collected by filtration. After two washing with HFE-347pc-f by stirring with HFE-347pc-f followed by filtration and 16 hours of vacuum drying at 210° C., 10.1 g of Polymer (F-5) was obtained. The ion exchange capacity was 1.29 meq/g dry resin.

<Preparation of Polymer (H-5) and Liquid Composition (D-5)>

Polymer (H-5) and Liquid Composition (D-5) were prepared in the manner as in Example 1-1 except that Polymer (F-5) was used instead of Polymer (F-1).

Example 1-6: Preparation Example

<Preparation of Polymer (F-6)>

A 230 mL stainless steel reactor was loaded with 67.8 g of monomer (m32-1), 4.81 g of monomer (m21-1), 0.04 g of C4-DVE and 87.6 g of HCFC-225cb as a polymerization medium, and after addition of 40.1 mg of IPP as a radical polymerization initiator, was cooled with liquid nitrogen and degassed sufficiently. Then, 6.90 g of TFE was fed, and the temperature was raised to 40° C. with stirring at 200 rpm to initiate the polymerization. After 6.3 hours of reaction at a constant inner temperature of 40° C., the reactor was cooled while the gas in the reaction system was purged, to terminate the polymerization. The remaining monomer (m22-1) was distilled out at 24° C. under reduced pressure for 3 hours to obtain a polymer solution.

The polymer solution was diluted with HCFC-225cb, and the polymer was aggregated by addition of hexane and collected by filtration. After three washings with hexane and 16 hours of vacuum drying at 210° C., 21.7 g of Polymer (F-6) was obtained. The ion exchange capacity was 1.39 meq/g dry resin.

<Preparation of Polymer (H-6) and Liquid Composition (D-6)>

Polymer (H-6) and Liquid Composition (D-6) were prepared in the manner as in Example 1-1 except that Polymer (F-6) was used instead of Polymer (F-1).

Example 1-7: Preparation Example

<Preparation of Polymer (F-7)>

A 230 mL stainless steel reactor was loaded with 97.4 g of monomer (m32-1), 17.1 g of monomer (m22-1) and 0.05 g of C3-DVE, and after addition of 1.57 g of 2.39 mass % solution of PFB in HFC-52-13p as a radical polymerization initiator, was cooled with liquid nitrogen and degassed sufficiently.

Then, 9.00 g of TFE was fed, and the temperature was raised to 24° C. with stirring at 100 rpm to initiate the polymerization. After 24 hours of reaction at a constant inner temperature of 24° C., the reactor was cooled while the gas in the reaction system was purged, to terminate the polymerization. The remaining monomer (m22-1) was distilled out at 24° C. under reduced pressure for 3 hours to obtain a polymer solution.

The polymer solution was diluted with HFC-52-13p, and the polymer was aggregated by addition of MeOH and collected by filtration. After three washings with a solvent mixture containing HFC-52-13p and MeOH in a 2/1 ratio (mass ratio) and 16 hours of vacuum drying at 210° C., 30.0 g of Polymer (F-7) was obtained. The ion exchange capacity was 1.39 meq/g dry resin.

<Preparation of Polymer (H-7) and Liquid Composition (D-7)>

Polymer (H-7) and Liquid Composition (D-7) were prepared in the manner as in Example 1-1 except that Polymer (F-7) was used instead of Polymer (F-1).

Example 1-8: Preparation Example

<Preparation of Polymer (F-8)>

A 495 mL stainless steel reactor was loaded with 226 g of monomer (m32-1) and 39.0 g of monomer (m22-1), and after addition of 3.00 g of 2.68 mass % PFB solution in HFC-52-13p as a radical polymerization initiator, was cooled with liquid nitrogen and degassed sufficiently.

Then, 11.0 g of TFE was fed, and the temperature was raised to 22° C. to initiate the polymerization. After 24 hours of reaction at a constant inner temperature of 22° C., the reactor was cooled while the gas in the reaction system was purged, to terminate the polymerization. The remaining monomer (m22-1) was distilled out at 24° C. under reduced pressure for 3 hours to obtain a polymer solution.

The polymer solution was diluted with HFC-52-13p, and the polymer was aggregated by addition of a solvent mixture containing HFC-52-13p and MeOH in a 80/20 ratio (mass ratio) and collected by filtration. After three washings with a solvent mixture containing HFC-52-13p and MeOH in a 50/50 ratio (mass ratio) and 16 hours of vacuum drying at 210° C., 58.7 g of Polymer (F-8) was obtained. The ion exchange capacity was 1.46 meq/g dry resin.

<Preparation of Polymer (H-8)>

Polymer (H-8) was prepared in the same manner as in Example 1-1 except that the cycle of 0.5 hr of immersion in 3N aqueous hydrogen chloride at 80° C. followed by filtration and 0.5 hr of immersion in ultrapure water at 80° C. followed by filtration was repeated 10 times in total, and Polymer (F-8) was used instead of Polymer (F-1).

<Preparation of Liquid Composition (D-8)>

23.0 g of Polymer (H-8), 48.5 g of EtOH and 48.5 g of ultrapure water (ultrapure water/EtOH=50/50 (mass ratio)) were sealed in a 0.2 L glass autoclave and stirred with a double helical blade at 110° C. for 6 hours at 300 rpm, allowed to cool and filtered through a pressure filtration module (filter paper: TCP-10V manufactured by ADVANTEC Toyo Kaisha, Ltd.) to obtain a uniform dispersion of Polymer (H-8) in the solvent mixture having a solid content of 19.3 mass %, which was designated as Liquid Composition (D-8).

Example 1-9: Preparation Example

<Preparation of Polymer (F-9)>

A 230 mL stainless steel reactor was loaded with 75.0 g of monomer (m32-1), 0.05 g of C4-DVE and 92.3 g of HFC-52-13p as a polymerization medium and was cooled with liquid nitrogen and degassed sufficiently.

Then, the temperature was raised to 70° C. with stirring at 230 rpm, and TFE was fed until the pressure at the same temperature reached 0.71 MPaG. A solution of 51.0 mg of V-601 as an initiator in 2.74 g of HFC-52-13p was injected into the reactor to initiate the polymerization. The reaction was continued for 6 hours while TFE was fed continuously while the pressure was maintained at 0.71 MPaG, and when the total feed of TFE reached 18.2 g, the reactor was cooled while the gas in the reaction system was purged, to terminate the polymerization. As a result a polymer solution was obtained.

The polymer solution was diluted with 100 g of HFC-52-13p, and the polymer was aggregated by addition of 400 g of HFE-347pc-f and collected by filtration. After two washing with HFE-347pc-f by stirring with 250 g of HFE-347pc-f followed by filtration and 16 hours of vacuum drying at 240° C., 32.0 g of Polymer (F-9) was obtained.

<Preparation of Polymer (H-9) and Liquid Composition (D-9)>

Polymer (H-9) and Liquid Composition (D-9) were prepared in the manner as in Example 1-1 except that Polymer (F-9) was used instead of Polymer (F-1).

The ion exchange capacities, TQ values or Q values and the contents (mol %) of respective species of monomer in the polymers are shown in Table 1.

TABLE 1

| | | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 |
|---|---|---|---|---|---|---|---|---|---|---|
| Polymer (F) | | F-1 | F-2 | F-3 | F-4 | F-5 | F-6 | F-7 | F-8 | F-9 |
| Autoclave [mL] | | 230 | 230 | 495 | 495 | 230 | 230 | 230 | 495 | 230 |
| Monomer corresponding to units A | Species | TFE | TFE | TFE | TFE | TFE | TFE | TFE | TFE | TFE |
| | Amount [g] | 9.11 | 9.12 | 14.6 | 21.6 | 4.20 | 6.90 | 9.00 | 11.0 | 15.0 |
| Monomer corresponding to units B | Species | m32-1 | m32-1 | m31-4 | m31-5 | m32-1 | m32-1 | m32-1 | m32-1 | m32-1 |
| | Amount [g] | 97.4 | 97.4 | 428 | 398 | 78.9 | 67.8 | 97.4 | 226 | 75.0 |
| Monomer corresponding to units C | Species | m22-1 | m22-1 | m22-1 | m22-1 | m24-1 | m21-1 | m22-1 | m22-1 | — |
| | Amount [g] | 17.1 | 17.2 | 63.4 | 93.9 | 31.1 | 4.81 | 17.1 | 39.0 | — |
| Monomer corresponding to units D | Species | C4-DVE | C4-DVE | C4-DVE | C4-DVE | C4-DVE | C4-DVE | C3-DVE | — | C4-DVE |
| | Amount [g] | 0.06 | 0.13 | 0.27 | 0.40 | 0.06 | 0.04 | 0.05 | — | 0.05 |
| Radical polymerization initiator | Species | PFB | IPP | IPP | IPP | IPP | IPP | PFB | PFB | V-601 |
| Amount of initiator | Amount [mg] | 37.7 | 36.1 | 148 | 148 | 45.5 | 40.1 | 37.6 | 80.4 | 51.0 |
| Polymerization temperature | [° C.] | 24 | 40 | 40 | 40 | 40 | 40 | 24 | 22 | 24 |
| Polymerization time | [hour] | 24 | 24 | 24 | 24 | 6 | 6.3 | 24 | 24 | 6 |
| Yield | [g] | 31.7 | 23.3 | 83.0 | 83.0 | 10.1 | 21.7 | 30.0 | 58.7 | 32.0 |
| Ion exchange capacity | [meq/g] | 1.39 | 1.54 | 1.16 | 1.44 | 1.29 | 1.39 | 1.39 | 1.46 | 1.38 |
| TQ value | [° C.] | >300 | 254 | >300 | >300 | >300 | >300 | >300 | 244 | 249 |
| Q value | [$mm^3/s$] | 56.0 | — | — | — | — | — | — | — | — |
| Polymer (H) | | H-1 | H-2 | H-3 | H-4 | H-5 | H-6 | H-7 | H-8 | H-9 |
| Content of units A | [mol %] | 29 | 29 | 11 | 11 | 15 | 35 | 29 | 17 | 56 |
| Content of units B | [mol %] | 49 | 49 | 70 | 70 | 45 | 55 | 49 | 57 | 44 |
| Content of units C | [mol %] | 22 | 22 | 19 | 19 | 40 | 10 | 22 | 25 | — |
| Content of units D | [mol %] | 0.05 | 0.1 | 0.05 | 0.05 | 0.05 | 0.05 | 0.05 | — | 0.05 |
| units D/units A | Molar ratio | $1.7 \times 10^{-3}$ | $3.5 \times 10^{-3}$ | $4.7 \times 10^{-3}$ | $4.7 \times 10^{-3}$ | $3.3 \times 10^{-3}$ | $1.4 \times 10^{-3}$ | $1.7 \times 10^{-3}$ | — | $0.9 \times 10^{-3}$ |
| units D/units C | Molar ratio | $2.2 \times 10^{-3}$ | $4.5 \times 10^{-3}$ | $2.6 \times 10^{-3}$ | $2.6 \times 10^{-3}$ | $1.3 \times 10^{-3}$ | $5.0 \times 10^{-3}$ | $2.2 \times 10^{-3}$ | — | — |
| Liquid Composition (D) | | D-1 | D-2 | D-3 | D-4 | D-5 | D-6 | D-7 | D-8 | D-9 |

Example 2-1

Ion exchange resin liquid AV1 described in Example 8 of JP-B-6468475 (a liquid composition in the form of a dispersion of a fluorinated polymer having acid-form sulfonic acid groups with an ion exchange capacity of 1.25 meq/g dry resin (in ethanol/water=60/40 (mass ratio), solid content=28.0 mass %)) was obtained. The liquid composition was applied onto a ethylene-tetrafluoroethylene copolymer sheet with a die coater while the amount of the liquid composition applied was adjusted so that the coating thickness would be 25 μm, and the coating of the liquid composition was dried at 80° C. and heated at 160° C. for 30 minutes to obtain a 25-μm thick electrolyte membrane to be used for cell tests.

3.0 g of a supported catalyst comprising 50 mass % platinum supported on carbon powder (product name: TEC10E50E, manufactured by TANAKA HOLDINGS Co., Ltd.), 18.61 g of water, 9.66 g of ethanol and 5.86 of Liquid Composition (D-1) were ground into a uniform dispersion by means of a planetary bead mill containing 100 g of zirconia beads with a diameter of 5 mm at a rotation speed of 300 rpm for 90 minutes, and then further ground with 24.67 g of water and 16.44 g of ethanol by means of the planetary bead mill at 300 rpm for another 90 minutes to obtain a cathode catalyst ink having a solid content of 8 mass %. The cathode catalyst ink was applied onto the electrolyte membrane to be used for cell test by means of an applicator, dried at 80° C. and heated at 160° C. for 30 minutes to obtain an electrolyte membrane combined with a cathode catalyst layer having a platinum content of 0.2 $mg/cm^2$.

A dispersion of a fluorinated polymer having acid-form sulfonic acid groups with an ion exchange capacity of 1.1 meq/g dry resin (solid content=26.0 mass %, ethanol/water=60/40 (mass ratio)) was prepared as described in Example 4 of JP-A-2018-55877 and was designated as Liquid Composition (D-10).

20.0 g of a supported catalyst comprising 50 mass % platinum supported on carbon powder (product name: TEC10E50E, manufactured by TANAKA HOLDINGS Co., Ltd.) and 117 g of water were sonicated for 10 minutes into a uniform dispersion and then mixed with 30.8 g of the liquid composition and 112 g of ethanol to obtain a catalyst ink having a solid content of 10 mass %. The catalyst ink was applied onto a ethylene-tetrafluoroethylene copolymer sheet, dried at 80° C. and heated at 160° C. for 30 minutes to obtain an anode catalyst layer sheet having a platinum content of 0.4 $mg/cm^2$.

The electrolyte membrane in the electrolyte membrane combined with a cathode catalyst layer was bonded to the anode catalyst layer in the anode catalyst layer sheet by hot-pressing at 130° C. under 1.5 MPa for 2 minutes, and the ethylene-tetrafluoroethylene copolymer sheet was peeled off to obtain a membrane-catalyst layer assembly having an electrode area of 25 $cm^2$.

The membrane-catalyst layer assembly was sandwiched between an anode gas diffusion base (product name: X0086 IX92 CX320, manufactured by NOK CORPORATION) and a cathode gas diffusion base (product name: H2315 T10X6 CX96, manufactured by NOK CORPORATION) to obtain a membrane electrode assembly. The gas diffusion bases each had a carbon layer comprising carbon particles and PTFE on one side, and the carbon layers in the gas diffusion bases were arranged so as to face the catalyst layers in the membrane-catalyst layer assembly.

Examples 2-2 to 2-9

Membrane electrode assemblies were obtained in the same manner as in Example 2-1 except that the liquid compositions shown in Table 2 were used to prepare cathode catalyst inks, and the amounts of the liquid compositions and the solvents were adjusted to make cathode catalyst inks of the same composition.

[Evaluation Test]

<Power Generation Characteristics>

Each of the membrane electrode assemblies obtained in Examples 2-1 to 2-9 was mounted in a power generation cell, and, and hydrogen gas (utilization rate 70%) and air (utilization rate 50%) were fed to the anode and the cathode, respectively, at a pressure of 151 kPa (absolute pressure), while the electrode membrane assembly was kept at a temperature of 80° C. The cell voltage at hydrogen and air humidities of 100% RH at a current density of 2 $A/cm^2$ was recorded. The power generation characteristics were rated on the following scale. The higher the cell voltage, the better the power generation characteristics of a polymer electrolyte fuel cell are. The results are shown in Table 2.

◎: cell voltage of at least 0.58 V

○: cell voltage of at least 0.50 V and lower than 0.58 V x: cell voltage lower than 0.50 V <Catalyst Layer Cracking>

An electrolyte membrane combined with a cathode catalyst layer was microphotographed with a digital microscope (VHX-5000, manufactured by Keyence Corporation) at a magnification of 200 with or without backlight on the electrolyte membrane combined with a cathode catalyst layer from the side opposite to the lens, and white spots observed only with the backlight were identified as cracks in the catalyst layer. The area percentage (%) of cracks in the catalyst layer to the field of view was calculated using the image processing software Image J and rated on the following scale. The results are shown in Table 2.

◎: less than 1%

○: at least 1% and less than 3% x: at least 3%

TABLE 2

| | | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 |
|---|---|---|---|---|---|---|---|---|---|---|
| Liquid composition | Species | D-1 | D-2 | D-3 | D-4 | D-5 | D-6 | D-7 | D-8 | D-9 |
| Evaluation results | Power performance | ◎ | ◎ | ○ | ◎ | ○ | ○ | ◎ | ○ | X |
| | Catalyst layer cracking | ◎ | ○ | ○ | ○ | ◎ | ◎ | ◎ | X | ◎ |

As shown in Table 2, when a polymer comprising units based on tetrafluoroethylene, units having an ion exchange group and no cyclic ether structure, units a cyclic ether structure and units based on a monomer having at least two polymerizable unsaturated bonds was used, crack-resistant catalyst layers were formed, and fuel cells with good power performance were provided.

This application is a continuation of PCT Application No. PCT/JP2022/015089, filed on Mar. 28, 2022, which is based upon and claims the benefit of priority from Japanese Patent Application No. 2021-055644 filed on Mar. 29, 2021. The contents of those applications are incorporated herein by reference in their entireties.

REFERENCE SYMBOLS

10 membrane electrode assembly

11 catalyst layers

12 gas diffusion layers

13 anode

14 cathode

15 polymer electrolyte membrane

What is claimed is:

1. An electrolyte material made of a polymer having ion exchange groups, wherein the polymer comprises units based on tetrafluoroethylene, units having an ion exchange group and no cyclic ether structure, units having a cyclic ether structure and units based on a monomer having at least two polymerizable unsaturated bonds.

2. The electrolyte material according to claim 1, wherein the molar ratio of units based on a monomer having at least two polymerizable unsaturated bonds to units based on tetrafluoroethylene is from $4.3\times10^{-4}$ to $9.9\times10^{-3}$.

3. The electrolyte material according to claim 1, wherein the molar ratio of units based on a monomer having at least two polymerizable unsaturated bonds to units having a cyclic ether structure is from $6.7\times10^{-4}$ to $9.9\times10^{-3}$.

4. The electrolyte material according to claim 1, wherein the content of units based on a monomer having at least two polymerizable unsaturated bonds is from 0.001 to 10 mol % relative to all the units constituting the polymer having ion exchange groups.

5. The electrolyte material according to claim 1, wherein the units having a cyclic ether structure are at least one species of units selected from the group consisting units represented by the formula (u11), units represented by the formula (u12), units represented by the formula (u21), units represented by the formula (u22) and units represented by the formula (u24):

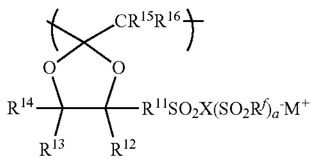

(u11)

-continued (u12)

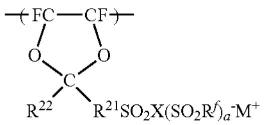

(u21)

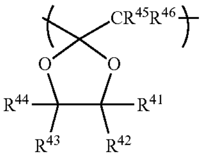

(u22)

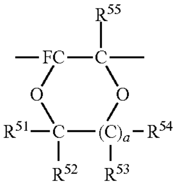

(u24)

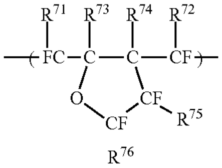

wherein in the formula (u11), $R^{11}$ is a bivalent perfluoroalkylene group which may have an ethereal oxygen atom, each of $R^{12}$, $R^{13}$, $R^{15}$ and $R^{16}$ is independently a monovalent perfluoroalkyl group which may have an ethereal oxygen atom or a fluorine atom, $R^{14}$ is a monovalent perfluoroalkyl group which may have an ethereal oxygen atom, a fluorine atom or a group represented by $—R^{11}(SO_2X(SO_2R^f)_a)^-M^+$ wherein $M^+$ is $H^+$, a monovalent metal cation or an ammonium ion which may have at least one hydrocarbon group instead of a hydrogen atom, $R^f$ is a linear or branched perfluoroalkyl group which may have an ethereal oxygen atom, and X is an oxygen atom, a nitrogen atom or a carbon atom, and when X is an oxygen atom, a=0, when X is a nitrogen atom, a=1, and when X is a carbon atom, a=2, in the formula (u12), $R^{21}$ is a $C_{1-6}$ perfluoroalkylene group or a $C_{2-6}$ perfluoroalkylene group which has an ethereal oxygen atom between carbon atoms, $R^{22}$ is a fluorine atom, a $C_{1-6}$ perfluoroalkyl group, a $C_{2-6}$ perfluoroalkyl group which has an ethereal oxygen atom between carbon atoms or a group represented by $—R^{21}(SO_2X(SO_2R^f)_a)^-M^+$ wherein $M^+$, $R^f$, X and a are the same as described above, respectively, in the formula (u21), each of $R^{41}$, $R^{42}$, $R^{43}$, $R^{44}$, $R^{45}$ and $R^{46}$ is independently a monovalent perfluoroalkyl group which may have an ethereal oxygen atom or a fluorine atom, in the formula (u22), s is 0 or 1, each of $R^{51}$ and $R^{52}$ is independently a fluorine atom, a $C_{1-5}$ perfluoroalkyl group or $R^{51}$ and $R^{52}$ are bonded together to form a spiro ring (provided that s is 0), each of $R^{53}$ and $R^{54}$ is independently a fluorine atom or a $C_{1-5}$ perfluoroalkyl group, and $R^{55}$ is a fluorine atom, a $C_{1-5}$ perfluoroalkyl group or a $C_{1-5}$ perfluoroalkoxy group, and in the formula (u24), each of $R^{71}$, $R^{72}$, $R^{73}$, $R^{74}$, $R^{75}$ and $R^{76}$ is independently a monovalent perfluoroalkyl group which may have an ethereal oxygen atom or a fluorine atom.

6. The electrolyte material according to claim 5, wherein the units having a cyclic ether structure are units represented by the formula (u22).

7. The electrolyte material according to claim 1, wherein the units based on a monomer having at least two polymerizable unsaturated bonds are units represented by the formula (u41):

(u41)

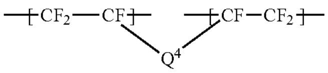

wherein in the formula (u41), $Q^4$ is an oxygen atom or a bivalent perfluoroalkylene group which may have an ethereal oxygen atom.

8. The electrolyte material according to claim 7, wherein the units based on a monomer having at least two polymerizable unsaturated bonds are units represented by at least one of the formula (u41-1), the formula (u41-2) and the formula (u41-3):

(u41-1)

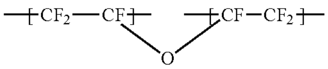

(u41-2)

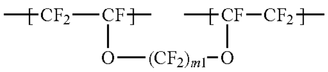

(u41-3)

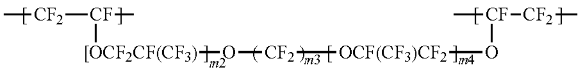

wherein in the formula (u41-2) and the formula (u41-3), m1+m3 are integers of from 2 to 8, and in the formula (u41-3), each of m2 and m4 is independently an integer of from 0 to 5, provided that m2+m4≥1.

9. The electrolyte material according to claim 1, wherein the units having an ion exchange group and no cyclic ether structure are represented by at least one of the formula (u31) and the formula (u32):

(u31)

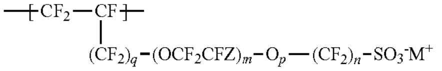

(u32)

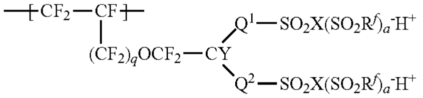

wherein in the formula (u31), Z is a fluorine atom or a trifluoromethyl group, q is 0 or 1, m is an integer of from 0 to 3, p is 0 or 1, n is an integer of from 1 to 12, provided that m+p>0, and $M^+$ is $H^+$, a monovalent metal cation or an ammonium ion which may have at least one hydrocarbon group instead of a hydrogen atom, and in the formula (u32), $Q^1$ is a perfluoroalkylene group which may have an ethereal oxygen atom, $Q^2$ is a single bond or a perfluoroalkylene group which may have an ethereal oxygen atom, Y is a fluorine atom or a monovalent perfluoroalkyl group, q is 0 or 1, $R^f$ is a linear or branched perfluoroalkyl group which may have an ethereal oxygen atom, X is an oxygen atom, a nitrogen atom or a carbon atom, and when X is an oxygen atom, a=0, when X is a nitrogen atom, a=1, and when X is a carbon atom, a=2, provided that two or more $R^f$'s, if present, may be identical or different.

10. The electrolyte material according to claim 1, wherein the polymer has an ion exchange capacity of from 0.5 to 2.5 meq/g dry resin.

11. A membrane electrode assembly comprising an anode comprising a catalyst layer comprising a catalyst and an electrolyte material made of a polymer having ion exchange groups, a cathode comprising a catalyst layer comprising a catalyst and an electrolyte material made of a polymer having ion exchange groups, and a polymer electrolyte membrane comprising a fluorinated polymer having ion exchange groups sandwiched between the anode and the cathode, wherein at least one of the electrolyte material in the anode and the electrolyte material in the cathode is the electrolyte material as defined in claim 1.

12. A polymer electrolyte fuel cells comprising the membrane electrode assembly as defined in claim 11.

* * * * *